US012681243B2

(12) United States Patent　　(10) Patent No.:　US 12,681,243 B2
Chiu et al.　　(45) Date of Patent:　Jul. 14, 2026

(54) THERMAL STRUCTURE FOR A MICRO-RING RESONATOR (MRR) IN A PHOTONIC INTEGRATED CIRCUIT (PIC)

(71) Applicant: Intel Corporation, Santa Clara, CA (US)

(72) Inventors: Chia-Pin Chiu, Tempe, AZ (US); Omkar G. Karhade, Chandler, AZ (US); Kaveh Hosseini, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 17/725,018

(22) Filed: Apr. 20, 2022

(65) Prior Publication Data

US 2023/0341638 A1　　Oct. 26, 2023

(51) Int. Cl.
*G02B 6/42*　　(2006.01)
*G02B 6/293*　　(2006.01)

(52) U.S. Cl.
CPC ....... *G02B 6/4212* (2013.01); *G02B 6/29338* (2013.01); *G02B 6/4206* (2013.01); *G02B 6/4273* (2013.01); *G02B 6/428* (2013.01)

(58) Field of Classification Search
None
See application file for complete search history.

(56) References Cited

U.S. PATENT DOCUMENTS

| | | | | |
|---|---|---|---|---|
| 6,751,377 B2 * | 6/2004 | Baumann | ........... | G02B 6/12007 |
| | | | | 385/32 |
| 10,132,957 B2 * | 11/2018 | Hentz | ................ | G02B 6/29335 |
| 10,156,676 B1 * | 12/2018 | Shank | ................... | H10F 77/413 |
| 2011/0255822 A1 * | 10/2011 | Zheng | ................. | G02B 6/3508 |
| | | | | 385/16 |
| 2019/0139819 A1 * | 5/2019 | Jaffe | ................... | H10D 62/115 |
| 2020/0174186 A1 * | 6/2020 | Westerveld | ........ | G02B 6/12002 |

OTHER PUBLICATIONS

Dong, Po, et al., "Thermally tunable silicon racetrack resonators with ultralow tuning power," Optics Express; vol. 18, No. 19; Sep. 13, 2010; pp. 20298-20304; 7 pages.
Pan, Ying, et al., "Thermally tunable silicon microring resonators with ultralow tuning power," SPIE vol. 11048; 2019; Zhuhai, China; pp. 1104839-1-1104839-4; downloaded from https://www. spiedigitallibrary.org/conference-proceedings-of-spie on Dec. 23, 2021; 5 pages.

* cited by examiner

*Primary Examiner* — Jerry Rahll
(74) *Attorney, Agent, or Firm* — Alliance IP, LLC

(57)　　　ABSTRACT

Variations in a thermal structure for an open cavity photonic integrated circuit (OCPIC) having an MRR. The structure includes an air trench in fluid communication with an air cavity that is located under the MRR. The air trench is a gap/opening in the oxide that encircles at least a portion of the MRR and extends outward radially therefrom, with a consistent width, to a diameter D1. An oxide cladding is not removed in areas that are used for metal traces and routing. The structure is characterized by straight walls along the air trench. The structure has a lower diameter D2, measured at a bottom/floor of the air cavity. In various embodiments, D2 is substantially equal to D1.

25 Claims, 9 Drawing Sheets

Cross section AA'

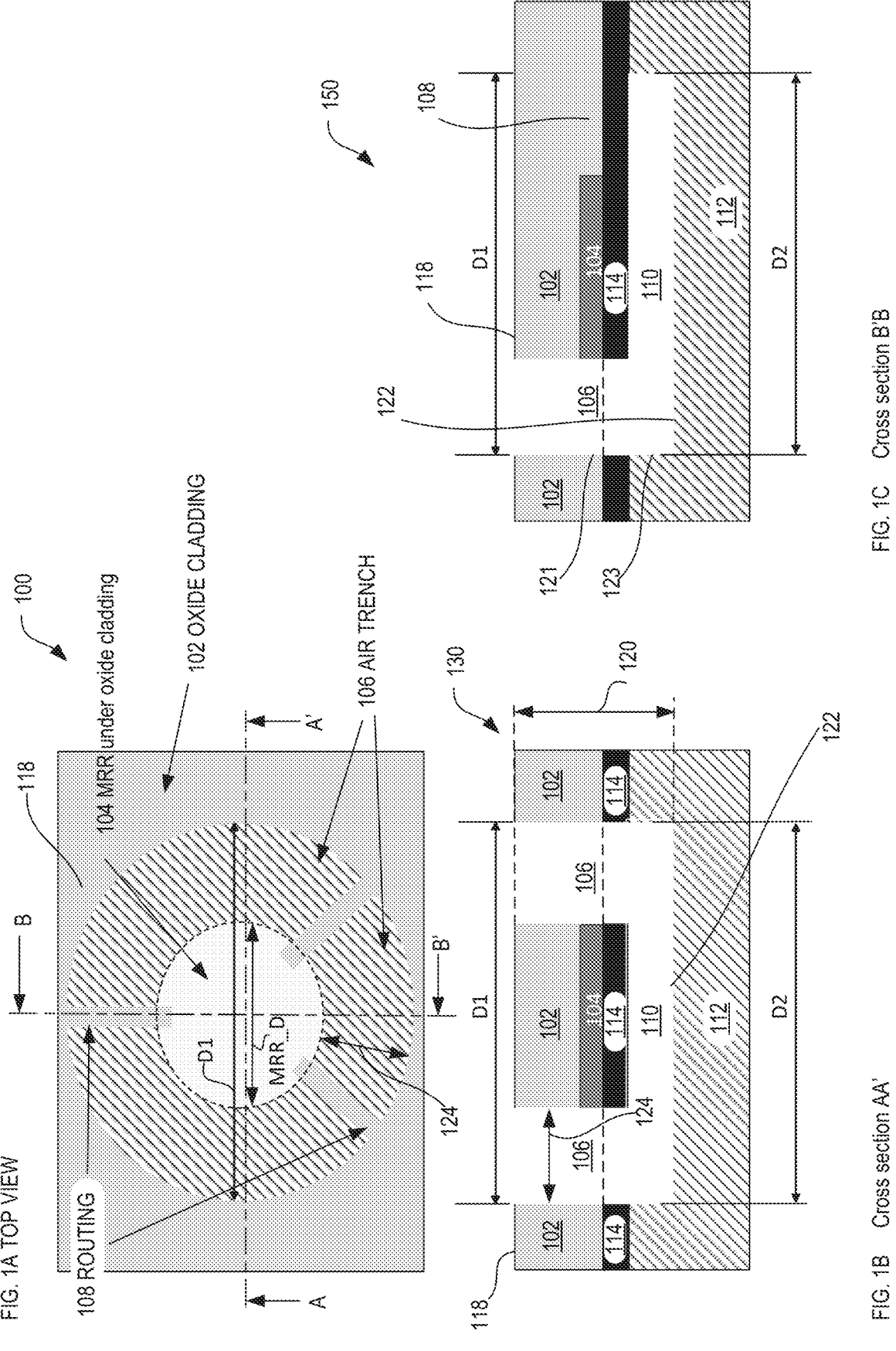
FIG. 1A TOP VIEW
104 MRR under oxide cladding
102 OXIDE CLADDING
106 AIR TRENCH
108 ROUTING
FIG. 1B   Cross section AA'
FIG. 1C   Cross section B'B

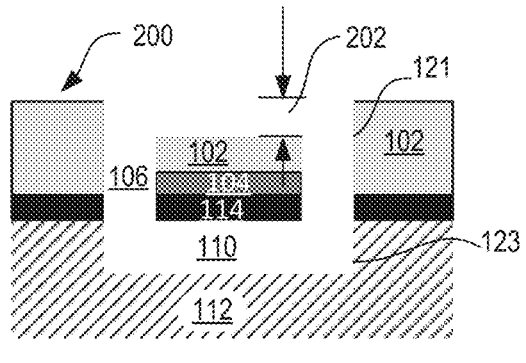
FIG. 2A    Cross section AA'
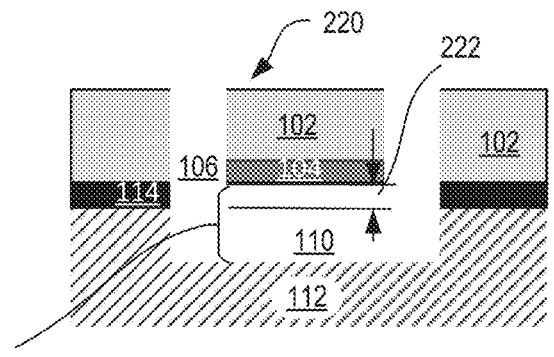
FIG. 2C    Cross section AA'
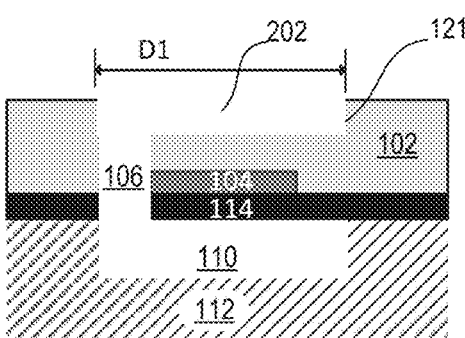
FIG. 2B    Cross section B'B
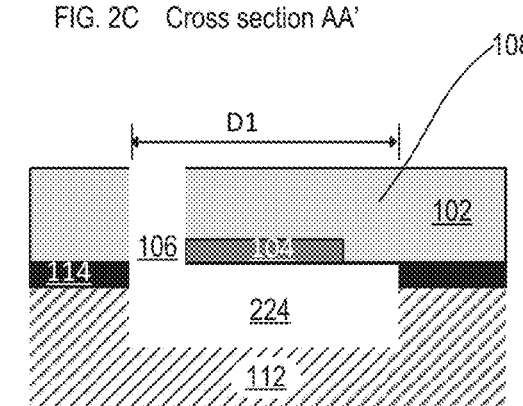
FIG. 2D    Cross section B'B
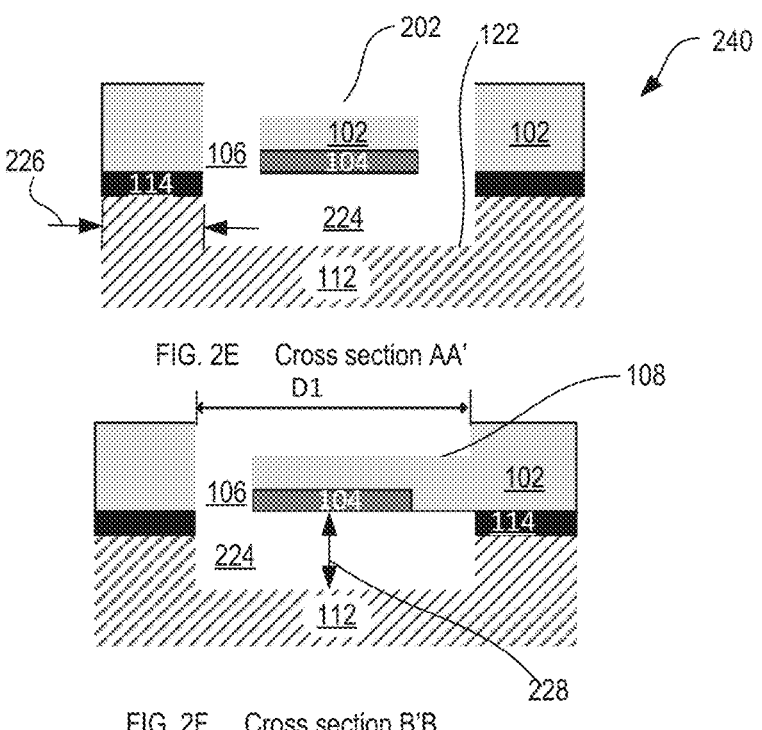
FIG. 2E    Cross section AA'
FIG. 2F    Cross section B'B

500

600

602

602

PRINTED CIRCUIT BOARD 903        HOUSING 901

900

| PROCESSOR UNIT 902 | COMMUNICATION COMPONENT 912 |
| MEMORY 904 | BATTERY/POWER 914 |
| DISPLAY DEVICE 906 | GNSS DEVICE 918 |
| AUDIO OUTPUT DEVICE 908 | AUDIO INPUT DEVICE 924 |
| AN OTHER OUTPUT DEVICE 910 | AN OTHER INPUT DEVICE 920 |

ANTENNA 922

THERMAL STRUCTURE FOR A MICRO-RING RESONATOR (MRR) IN A PHOTONIC INTEGRATED CIRCUIT (PIC)

STATEMENT OF GOVERNMENT INTEREST

This invention was made with Government support under Agreement No. HR00111830002 awarded by the United States Department of Defense. The Government has certain rights in the invention.

BACKGROUND

Silicon photonics combines integrated circuits and semiconductor lasers and has enabled the combination of previously disparate optical components into silicon photonic integrated circuits (PIC) with fewer silicon photonics components that are more compact and lower power. One such silicon photonics component is a micro-ring resonator (MRR). A given PIC may have multiple MRRs, depending on the application. The MRRs have embedded micro-heaters that generate heat during operation. The MRR-generated heat can adversely affect power efficiency of the PIC and its performance in applications, especially in open cavity and fine pitch applications.

BRIEF DESCRIPTION OF THE DRAWINGS

FIGS. 1A-1C are illustrations providing different views of a structure for an open cavity photonic integrated circuit (OCPIC), in accordance with various embodiments.

FIGS. 2A-2F are illustrations depicting variations in a structure for an OCPIC having an MRR, in accordance with additional embodiments.

DETAILED DESCRIPTION

Figure 3:
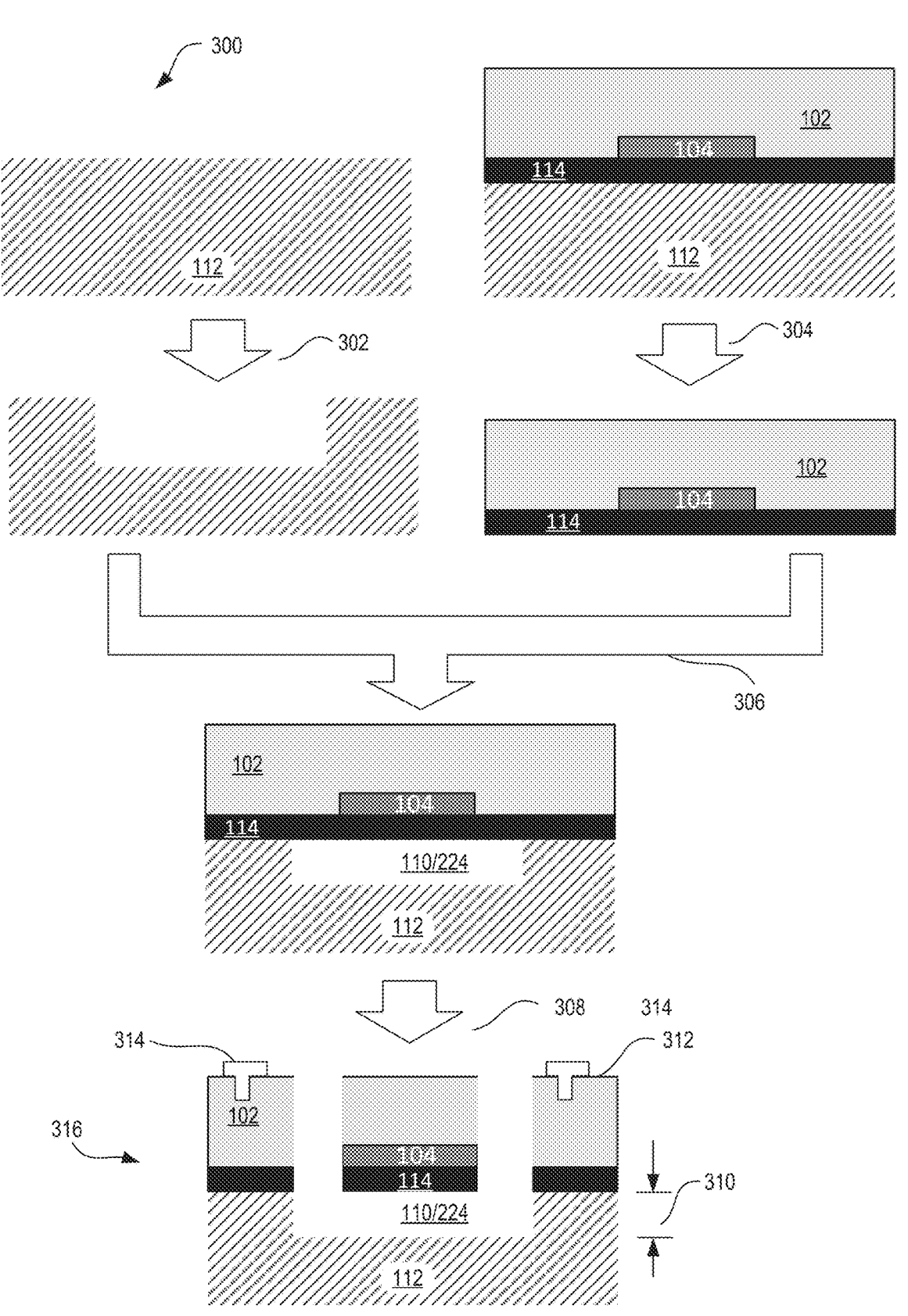
FIG. 3 depicts a first non-limiting method for manufacturing a structure for an OCPIC having an MRR.

The following detailed description is merely exemplary in nature and is not intended to limit the application and uses. It may be evident that the novel embodiments can be practiced without every detail described herein. For the sake of brevity, well known structures and devices may be shown in block diagram form in order to facilitate a description thereof.

Silicon photonics is a technology that has enabled the combination of previously disparate optical components into silicon photonic integrated circuits (PICs) having fewer components that are more compact and lower power than other technologies. A non-limiting example is a component called a silicon micro-ring resonator (MRR). The MRR is a passive silicon waveguide structure generally including an optical waveguide that is looped back on itself to resonate at one or more frequencies referred to as a spectral response, or free spectral range (FSR), of the MRR. Silicon photonics has enabled the MRR to be very compact (i.e., have a small bend radius). An exemplary PIC can have thousands of MRRs.

Various embodiments of the MRR can generate undesirable heat during operation. In some PIC applications, a cavity is created in a package substrate, and the PIC (comprising one or more MRRs) is placed in the cavity; the embodiment of the PIC prepared for the open cavity is referred to herein as an open-cavity PIC (OCPIC). Heat generated by the MRR in an OCPIC application can be especially technically challenging, because the OCPIC may be located next to an electronic integrated circuit (EIC), and the heat generated by the MRR can adversely impact performance and power efficiency of the EIC, and/or a multi-chip package system that the OCPIC is utilized in. In some scenarios, such as wavelength division multiplexing (WDM) applications, the adverse effects of the heat from the MRR may be observed as an elevated energy-per-bit of a channel of a WDM system on a fiber array unit (FAU) connector on the MCP. Accordingly, dissipating the heat from the MRR in an OCPIC is a technical problem to solve.

Some solutions utilize isotropic etching, performed from the top surface of the OCPIC, to create an air cavity under the MRR to dissipate heat. Air cavities created in this manner are notably characterized by a rounded shape that balloons out or extends under the MRR, appearing somewhat as a half-sphere with rounded outer walls. These solutions are often also characterized by an area of overly thinned silicon under a buried oxide (BOX) layer. These air cavities can assume a large amount of real estate compared to the area of the MRR, drive a large bump pitch compared to what the OCPIC could otherwise support, and limit how close a neighboring component can be to the OCPIC.

The present disclosure provides a technical solution to the above-described problems related to heat generated by a MRR and provides an improvement over the limitations of available solutions, in the form of a thermal structure for an open-cavity photonic integrated circuit (OCPIC) (shortened herein to "structure") or any integrated circuit comprising an MRR. The thermal structure, shortened herein to "structure," is a thermal architecture that can be built around the MRR, and is described in more detail in connection with the figures below.

Exemplary embodiments will hereinafter be described in conjunction with the following drawing figures, wherein like numerals denote like elements. Figures are not necessarily to scale but may be relied on for spatial orientation and relative positioning of features. As may be appreciated, certain terminology, such as "ceiling" and "floor", as well as "upper,", "uppermost", "lower," "above," "below," "bottom," and "top" refer to directions based on viewing the Figures to which reference is made. Further, terms such as "front," "back," "rear,", "side", "vertical", and "horizontal" may describe the orientation and/or location of portions of the component within a consistent but arbitrary frame of reference which is made clear by reference to the text and the associated Figures describing the component under discussion. Such terminology may include the words specifically mentioned above, derivatives thereof, and words of similar import.

As used herein, the term "adjacent" refers to layers or components that are in direct physical contact with each other, with no layers or components in between them. For example, a layer X that is adjacent to a layer Y refers to a layer that is in direct physical contact with layer Y. In contrast, as used herein, the phrase(s) "located on" (in the alternative, "located under," "located above," or "located next to," in the context of a first layer or component located on a second layer or component) includes (i) configurations in which the first layer or component is directly physically attached to the second layer (i.e., adjacent), and (ii) component and configurations in which the first layer or component is attached (e.g. coupled) to the second layer or component via one or more intervening layers or components.

The term "overlaid" (past participle of "overlay") may be used to refer to a layer to describe a location and orientation for the layer but does not imply a method for achieving the location and orientation. For example, a first layer overlaid on a second layer, or overlaid on a component means that the first layer is spread across or superimposed on the second layer or component. Accordingly, a layer that is overlaid on a second layer is also adjacent to the second layer.

As used herein, the term "electronic component" can refer to an active electronic circuit (e.g., processing unit, memory, storage device, FET) or a passive electronic circuit (e.g., resistor, inductor, capacitor).

As used herein, the term "integrated circuit component" can refer to an electronic component configured on a semi-conducting material to perform a function. An integrated circuit (IC) component can comprise one or more of any computing system components described or referenced herein or any other computing system component, such as a processor unit (e.g., system-on-a-chip (SoC), processor core, graphics processor unit (GPU), accelerator, chipset processor), I/O controller, memory, or network interface controller, and can comprise one or more additional active or passive devices such as capacitors, decoupling capacitors, resistors, inductors, fuses, diodes, transformers, sensors, electrostatic discharge (ESD) devices, and memory devices.

A non-limiting example of an unpackaged integrated circuit component includes a single monolithic integrated circuit die (shortened herein to "die"); the die may include solder bumps attached to contacts on the die. When present on the die, the solder bumps or other conductive contacts can enable the die to be directly attached to a printed circuit board (PCB).

A non-limiting example of a packaged integrated circuit component comprises one or more integrated circuit dies mounted on a package substrate with the integrated circuit dies and package substrate encapsulated in a casing material, such as a metal, plastic, glass, or ceramic. Often the casing includes an integrated heat spreader (IHS); the packaged integrated circuit component often has bumps or leads attached to the package substrate for attaching the packaged integrated circuit component to a printed circuit board or motherboard.

In FIG. 1A, a top view illustrating a structure for an open cavity photonic integrated circuit (OCPIC). Various embodiments include an oxide 102 layer (also referred to herein as "oxide cladding") over a substrate 112 or wafer, and a first region (inner region) thereof having a MRR 104 in between the oxide 102 layer and the substrate 112, and a second region (an outer region) thereof not having the MRR 104. Embodiments of the structure are characterized by the geometries and spatial relationships described herein.

The oxide 102 layer is a layer comprising oxide, extends past the MRR 104, and may include silicon dioxide. The MRR 104 is a silicon waveguide structure that may comprise lightly-doped P region, lightly-doped N region, highly-doped P+ region, highly-doped N+ region, intrinsic silicon and silicon dioxide (as a divider between different Si doping regimes when needed). In some embodiments, in areas not including the MRR 104, the oxide layer and the BOX 114 may be indistinguishable from each other. A non-limiting way to identify the MRR 104 is to visually inspect both the materials present in a cross-sectional view and the structure and shape of the materials to determine that the silicon waveguide has been implemented. Although, in various embodiments, the MRR 104 may comprise the same materials as a CMOS component, the structure of the MRR 104, and its shape employ different doping profiles than a CMOS component. Various embodiments of the MRR 104 may have a thickness of about 220 nanometers. In various embodiments, the MRR 104 may be located on a silicon-on-insulator (SOI) wafer, and the substrate 112 is silicon.

In some embodiments, a buried oxide layer (BOX) 114 layer may be located on the substrate 112, and between the MRR 104 and the substrate 112. The BOX 114 may comprise silicon dioxide. In various embodiments the BOX 114 layer is about 2-3 micron thick, and the silicon layer may be about 220 nanometers thickness (wherein "about" means plus or minus 2%). In various embodiments, the MRR 104 is circular (i.e., +/−10%), with a diameter MRR D.

Embodiments of the structure include an air trench 106 and an air cavity 110 that is located under the MRR 104. Although distinguished in the figures with a dashed line, in practice, air trench 106 and air cavity 110 are in fluid communication with each other, i.e., they create one continuous air gap. Viewing FIG. 1A, a top-down view, the air trench 106 is a gap/opening in the oxide 102 that encircles at least a portion of the MRR 104 and extends outward radially therefrom, with a consistent width 124, to a diameter D1. A cross-sectional view 130 corresponding to a first cut AA' is depicted in FIG. 1B, and a cross-sectional view 150 corresponding to a second cut BB' is depicted in FIG. 1C. The first cut AA' and the second cut BB' intersect perpendicularly at a center/axis of the MRR 104.

The cross-sectional view corresponding to the second cut BB' illustrates that oxide 102 is not removed in areas that are used for waveguides and metal routing (shortened to "routing" 108) (to simplify the drawing, routing 108 is not shown). Said differently, the portion of the MRR 104 not encircled by the air trench 106 may be associated with routing 108. In the cross-sectional views, there is an upper diameter D1 and a lower diameter D2. The indicated D1 and D2 measurements are parallel and understood to be in three dimensions, coplanar with an upper surface of silicon layer 112 and with a surface of a wafer (e.g., wafer 600 FIG. 6) that the MRR is located on.

The air trench 106 may be characterized in two dimensions as a planar area represented by rotating a width 124 radially around the MRR 104. The air trench 106 may be characterized in two dimensions as a planar area with an outer diameter D1 (viewed on the top view shown in FIG. 1A). For embodiments in which the MRR 104 is circular around an axis, the air trench 106 may be characterized as being coaxial with the MRR 104 (viewed on the top view shown in FIG. 1A). The width 124 is measured radially from an inner diameter to an outer diameter (denoted "upper" diameter D1 in the side views) at segment 121. In various embodiments, the inner diameter of the air trench 106 is substantially the same as a diameter of the MRR 104, and the outer diameter (D1) is greater than the diameter of the MRR 104. In various embodiment, D1 is within a range of 2%-600% larger than a diameter of the MRR 104.

As shown in the FIGS. 1B-1C, the air trench 106 is an opening in at least the oxide 102 and substrate 112. The air trench 106 may be further characterized by a depth 120. The depth 120 is measured from an upper surface 118 of the oxide to a floor 122; the depth 120 is substantially consistent throughout the air trench 106. Note that floor 122 is a floor to both the air trench 106 and the air cavity 110, i.e., they are continuous and together form a substantially planar area in the substrate 112. A substantially straight wall connects the upper surface 118 of the oxide to the floor 122 (as used herein, substantially means+/−5%, and substantially straight walls are +/−5% from perpendicular to the floor 122). The structure has a lower diameter D2, measured at the floor 122 of the air cavity 110 and air trench 106. As may be appreciated, the substantially straight wall and substantially consistent depth 120 assures that the lower diameter D2 is substantially equal to D1.

In various embodiments, the substantially straight wall located at D1 comprises a first segment 121 (in oxide 102 and defining the air trench 106) and a second segment 123 (in substrate 112 and defining at least a portion of the air cavity 110), and the first segment 121 and second segment 123 are continuous, as shown (as used herein, continuous means without seam or interruption). In embodiments in which a BOX 114 layer is present, the straight wall is continuous through the BOX 114 layer, as shown in the FIGS. 1B-1C.

The air trench may further include the floor 122, which is located in the substrate 112 layer. The floor 122 is notably substantially planar and defines a bottom of both the air trench 106 and the air cavity 110. The floor 122 is coplanar with an upper surface of the substrate 112 and is characterized by the diameter D2.

The structure has a lower diameter D2, measured at a bottom/floor 122 of the air cavity 110 and structure. In various embodiments, D2 is substantially coaxial with D1. D2 includes or represents the air trench 106 width 124 and the air cavity 110.

As is illustrated by comparing FIGS. 1B-1C, in various embodiments, the structure is characterized by a geometry that extends vertically, along the straight wall (segment 121 and segment 123), from the top surface 118 of the oxide 102, through an optional buried oxide layer (BOX 114), to the floor 122 in the silicon layer 112, to a total depth 120, with exception to locations used for signal routing 108 on the oxide 102. The structure omits the air trench 106 in areas of routing 108, so that the oxide 102 can provide a continuous and uninterrupted bridge to the MRR 104 for the routing 108, but embodiments may extend the air cavity 110 laterally (left and right on the page) below the signal routing 108, as shown. Regardless of the location of the air trench 106 and air cavity 110, the structure is further characterized by walls (segment 121 and segment 123) not undercutting the silicon under the BOX 114 and oxide 102 at the outer edge.

Moving to FIGS. 2A-2F, and with continued reference to FIGS. 1A-1C, additional embodiments of the structure are described. The figures are organized as follows: FIGS. 2A and 2B illustrate embodiment 200, FIGS. 2C and 2D illustrate embodiment 220, and FIGS. 2E and 2F illustrate embodiment 240. Further, FIGS. 2A, 2C, and 2E are cross-sectional views along first cut AA' (and can may be compared to FIG. 1B) and FIGS. 2B, 2D, and 2F are cross-sectional views along the second cut BB' (and may be compared to FIG. 1C).

In embodiment 200, the oxide 102 layer includes a thinned area of thickness 202 (e.g., by etching) above the MRR 104, to reduce heat loss from the MRR to an upper surface of the structure. Note that the walls continue to be substantially straight, as described above. As may be appreciated, this embodiment adds an additional air cavity located on the MRR 104 to the air cavity 110 of the structure, the additional air cavity being continuous (i.e., in fluid communication) with the air trench 106 and air cavity 110 of the structure and defined by a volume of diameter D1 and thickness 202.

In embodiment, 220, the BOX 114 is removed under the MRR 104, to reduce lateral heat spread from the MRR 104 to the Si 112 and oxide 102 layer. This adds an additional air cavity located under the MRR 104 to the structure, the additional air cavity being continuous with the previous air cavity 110 of the structure and defined by a volume substantially equal to the MRR diameter times the height 222, creating a total air cavity 224. Air cavity 224 is equal to air cavity 110 plus the volume created by height 222.

In embodiment, 240, the BOX 114 is removed under the MRR 104, and a layer of thickness 202 is removed from the oxide 102 above the MRR 104. The air cavity of the structure in embodiment 240 has a greater volume than the air cavity in the structure of either of the embodiments 200 or 220, holding other features constant.

In reviewing FIGS. 1A-2F, it may be appreciated that the embodiments of the structure are characterized by having a D1 that is substantially equal to D2 and are further characterized by substantially straight walls. As mentioned, in available solutions, the magnitude of D2 may be much greater than D1 (e.g., D2 is in a range of about 1.5-2 times D1, and side walls may not be straight, for example, due to the isotropic etching of the substrate (e.g., 112) to create the air cavity and air trenches. Another advantage of the structure is that substantially straight walls retain a consistent thickness 226 (viewed vertically from the planar floor 122 to the BOX 114 layer in the cross-sectional views) in the substrate 112 on an outer edge of the structure; this increases robustness and fosters adjacent placement of other integrated circuit components or die bumps close to the MRR. In contrast, as a function of the geometry of available solutions, cross-sectional views of these outer wall areas can be very inconsistent. Yet another advantage of the provided embodiments is that in all of them, the air cavity (110 and 224) each ensure a consistent separation 228 (when viewed from left to right in the figures) of the Substrate 112 and the MRR 104. In contrast, available solutions may have a region under the MRR 104 that is characterized by observable peaks in the substrate 112 (i.e., peaks in the "floor" area); in some scenarios these peaks are substantial enough to introduce a connection between the MRR 104 and the substrate 112, such that, undesirably, a significant amount of heat can transfer from the MRR 104 to the substrate 112 at these locations.

Embodiments of the herein disclosed structure advantageously accomplish the necessary heat dissipation using much less real estate than available solutions, supports a smaller bump pitch compared to available solutions, and enables closer placement of neighboring components to the MRR compared to available solutions. Additionally, embodiments increase the power efficiency of the MRR in the OCPIC, delivering a lower pico-Joule per bit.

FIG. 3 illustrates an example method 300 of manufacturing of a structure for an open-cavity photonic integrated circuit (OCPIC) having a micro-ring resonator (MRR). At 302, on a first substrate (in various embodiments, the substrate can be silicon layer 112, a glass layer), thinning a region of the substrate or silicon layer 112 (e.g., by anisotropically etching or mechanically thinning) to create an air cavity 110 or air cavity 224 therein, the air cavity 110 having a diameter D2 and a planar floor. On a second substrate (e.g., silicon) having a MRR manufactured thereon, at 304, removing a silicon layer 112 under the MRR. At 306, attaching the air cavity side of the first piece of silicon or glass to the second piece of BOX 114, oxide 102 layer and MRR 104 (e.g., by silicon-to-oxide bonding, oxide-to-oxide bonding or polymer gluing) to position and center the MRR 104 over the air cavity, creating an air cavity of height 310. At 308, the oxide layer 102 overlaying the MRR 104 may be etched to create the air trench that is in fluid communication with the air cavity, thereby completing the thermal structure, and solder bumps 314 or conductive contacts can be added to the top surface 312 of the OCPIC 316 post-etching. The OCPIC 316 may be referred to as a chiplet, e.g., in FIG. 5 OCPIC 502. In some embodiments, the OCPIC can be a packaged integrated circuit component.

Figure 4:
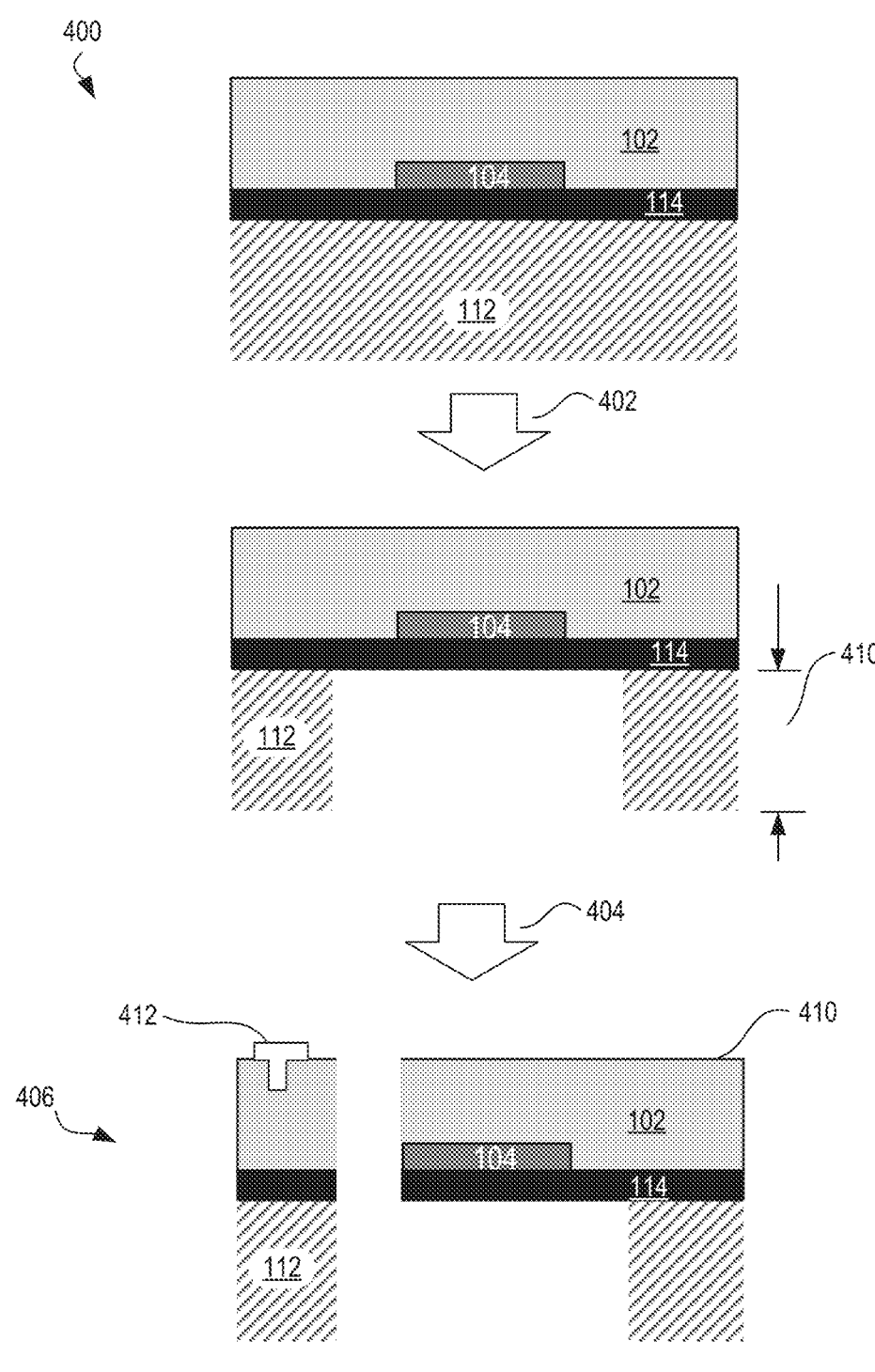
FIG. 4 depicts a second non-limiting method for manufacturing a structure for an OCPIC having an MRR.

FIG. 4 provides another example method 400 for manufacturing of a structure for an open-cavity photonic integrated circuit (OCPIC) having a micro-ring resonator (MRR). At 402, in a piece of substrate, such as silicon, a layer of the substrate may be etched from the bottom to create air cavity with height 410. At 404, the air trench is etched through the substrate and through an oxide 102 layer, also from the bottom. Embodiment 406 may be produced by anisotropic etching.

Figure 5:
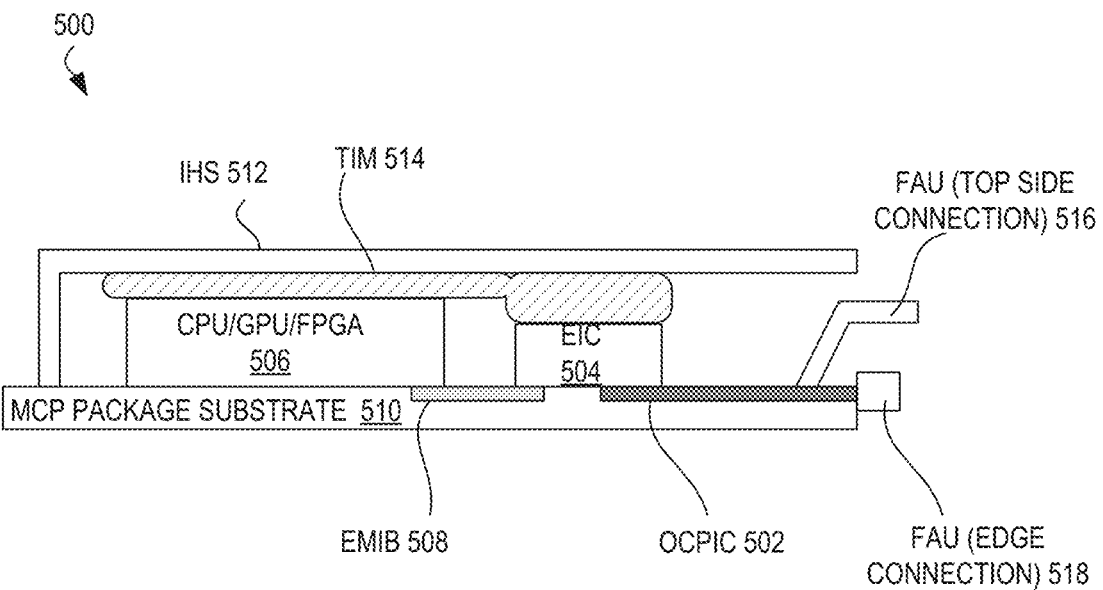
FIG. 5 is a simplified cross-sectional side view of a multi-chip package that includes an OCPIC, in accordance with various embodiments.

A multi-die integrated circuit component can be referred to as a multi-chip package (MCP) or, alternatively, a multi-chip module (MCM). FIG. 5 is a simplified cross-sectional side view of an exemplary multi-chip package (MCP) 500 that includes an OCPIC 502, in accordance with various embodiments. The MCP 500 may comprise one or more processor units, CPUs, graphics processors, or FPGAs, as represented by electronic integrated circuit (EIC) 504, and integrated circuit 506. In addition, the MCP 500 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets."

In some embodiments, the OCPIC 502 chiplet is embedded in a MCP package substrate 510. In other embodiments, the OCPIC 502 chiplet is attached to a MCP package substrate 510. The OCPIC 502 has an MRR (in practice, the OCPIC 502 has a plurality of MRRs, and the OCPIC further has a respective plurality of structures, as defined hereinabove). The OCPIC 502 is adjacent to the EIC 504 that is configured specifically to receive and process data from the OCPIC 502. In practice, interconnections between the dies and/or chiplets of MCP 500 can be provided by the package substrate 510, one or more silicon interposers, one or more silicon bridges 508 embedded in the package substrate 510 (such as Intel® embedded multi-die interconnect bridges (EMIBs)), or combinations thereof. Silicon bridge 508 is shown to operationally couple the integrated circuit 506 with the electronic integrated circuit 504.

A thermal insulation layer interface material (TIM) 514 may be located over the integrated circuit 506 and the electronic integrated circuit 504. The TIM 514 can be any suitable material, such as a silver thermal compound, thermal grease, phase change materials, indium foils or graphite sheets. An integrated heat spreader (IHS) 512, located on the TIM 514, covers the components of the MCP 500. In practice, the MCP 500, and the OCPIC 502 specifically, may communicate with other components in a device (e.g., device 900, FIG. 9) via a fiber array unit (FAU) connector. In various embodiments, the FAU connector may be a top side connector 516, such as a grating coupler, or an edge connector 518, such as a micro-lens or V-groove.

Figure 6:
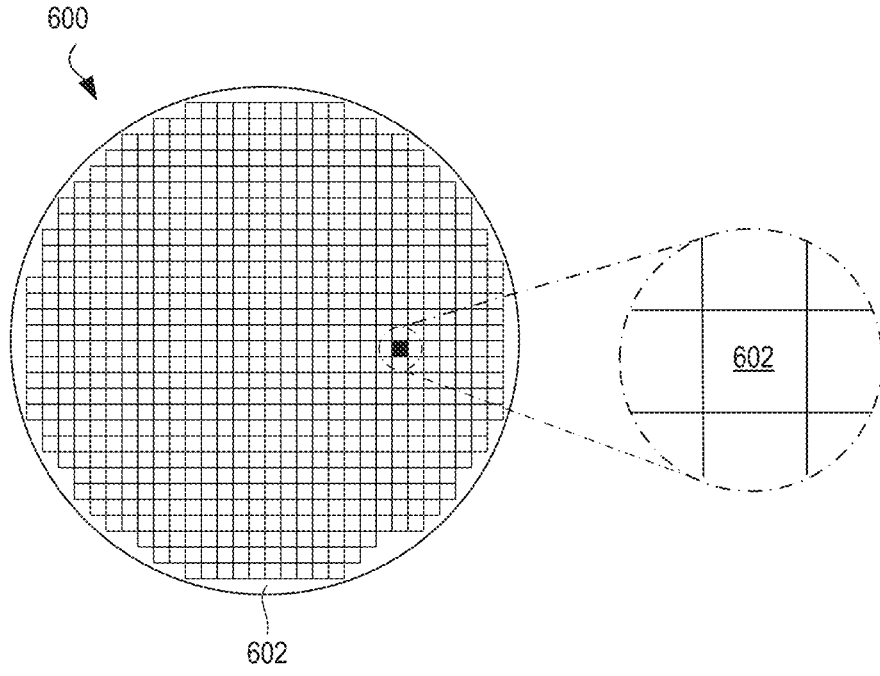
FIG. 6 is a top view of a wafer and dies that may be included in a microelectronic assembly, in accordance with any of the embodiments disclosed herein.

FIG. 6 is a top view of a wafer 600 and dies 602 that may be included in any of the embodiments disclosed herein. The wafer 600 may be composed of semiconductor material and may include one or more dies 602 formed on a surface of the wafer 600. After the fabrication of the integrated circuit components on the wafer 600 is complete, the wafer 600 may undergo a singulation process in which the dies 602 are separated from one another to provide discrete "chips" or destined for a packaged integrated circuit component. The individual dies 602, comprising an integrated circuit component, may include one or more transistors (e.g., some of the transistors 740 of FIG. 7, discussed below), supporting circuitry to route electrical signals to the transistors, passive components (e.g., signal traces, resistors, capacitors, or inductors), and/or any other integrated circuit components. In some embodiments, the wafer 600 or the die 602 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Additionally, multiple devices may be combined on a single die 602. For example, a memory array formed by multiple memory devices may be formed on a same die 602 as a processor unit (e.g., the processor unit 902 of FIG. 9) or other logic that is configured to store information in the memory devices or execute instructions stored in the memory array. In some embodiments, a die 602 may be attached to a wafer 600 that includes other die, and the wafer 600 is subsequently singulated, this manufacturing procedure is referred to as a die-to-wafer assembly technique.

Figure 7:
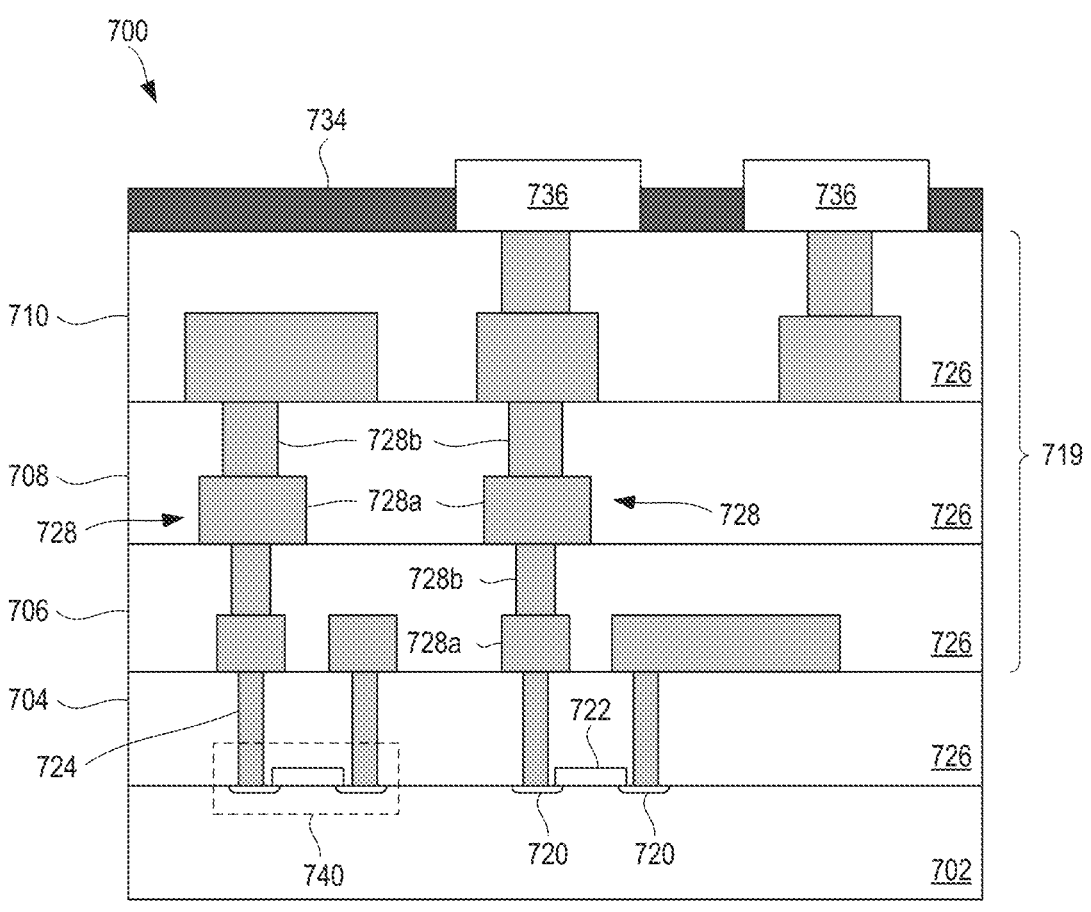
FIG. 7 is a simplified cross-sectional side view showing an implementation of an integrated circuit on a die that may be included in various embodiments, in accordance with any of the embodiments disclosed herein.

FIG. 7 is a cross-sectional side view of an integrated circuit 700 that may be included in any of the embodiments disclosed herein. One or more of the integrated circuits 700 may be included in one or more dies 602 (FIG. 6). The integrated circuit 700 may be formed on a die substrate 702 (e.g., the wafer 600 of FIG. 6) and may be included in a die (e.g., the die 602 of FIG. 6).

The die substrate 702 may be a semiconductor substrate composed of semiconductor material systems including, for example, n-type or p-type materials systems (or a combination of both). The die substrate 702 may include, for example, a crystalline substrate formed using a bulk silicon or a silicon-on-insulator (SOI) substructure. In some embodiments, the die substrate 702 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 702. Although a few examples of materials from which the die substrate 702 may be formed are described here, any material that may serve as a foundation for an integrated circuit 700 may be used. The die substrate 702 may be part of a singulated die (e.g., the dies 602 of FIG. 6) or a wafer (e.g., the wafer 600 of FIG. 6).

The integrated circuit 700 may include one or more device layers 704 disposed on the die substrate 702. The device layer 704 may include features of one or more transistors 740 (e.g., metal oxide semiconductor field-effect transistors (MOSFETs)) formed on the die substrate 702. The transistors 740 may include, for example, one or more source and/or drain (S/D) regions 720, a gate 722 to control current flow between the S/D regions 720, and one or more S/D contacts 724 to route electrical signals to/from the S/D regions 720.

The gate 722 may be formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 740 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 740 along the source-channel-drain direction, the gate electrode may consist of a U-shaped structure that includes a bottom portion substantially parallel to the surface of the die substrate 702 and two sidewall portions that are substantially perpendicular to the top surface of the die substrate 702. In other embodiments, at least one of the metal layers that form the gate electrode may simply be a planar layer that is substantially parallel to the top surface of the die substrate 702 and does not include sidewall portions substantially perpendicular to the top surface of the die substrate 702. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 720 may be formed within the die substrate 702 adjacent to the gate 722 of individual transistors 740. The S/D regions 720 may be formed using an implantation/diffusion process or an etching/deposition process, for example. In the former process, dopants such as boron, aluminum, antimony, phosphorous, or arsenic may be ion-implanted into the die substrate 702 to form the S/D regions 720. An annealing process that activates the dopants and causes them to diffuse farther into the die substrate 702 may follow the ion-implantation process. In the latter process, the die substrate 702 may first be etched to form recesses at the locations of the S/D regions 720. An epitaxial deposition process may then be carried out to fill the recesses with material that is used to fabricate the S/D regions 720. In some implementations, the S/D regions 720 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 720 may be formed using one or more alternate semiconductor materials such as germanium or a group III-V material or alloy. In further embodiments, one or more layers of metal and/or metal alloys may be used to form the S/D regions 720.

Electrical signals, such as power and/or input/output (I/O) signals, may be routed to and/or from the devices (e.g., transistors 740) of the device layer 704 through one or more interconnect layers disposed on the device layer 704 (illustrated in FIG. 7 as interconnect layers 706-710). For example, electrically conductive features of the device layer 704 (e.g., the gate 722 and the S/D contacts 724) may be electrically coupled with the interconnect structures 728 of the interconnect layers 706-710. The one or more interconnect layers 706-710 may form a metallization stack (also referred to as an "ILD stack") 719 of the integrated circuit 700.

The interconnect structures 728 may be arranged within the interconnect layers 706-710 to route electrical signals according to a wide variety of designs; in particular, the arrangement is not limited to the particular configuration of interconnect structures 728 depicted in FIG. 7. Although a particular number of interconnect layers 706-710 is depicted in FIG. 7, embodiments of the present disclosure include integrated circuits having more or fewer interconnect layers than depicted.

In some embodiments, the interconnect structures 728 may include lines 728a and/or vias 728b filled with an electrically conductive material such as a metal. The lines 728a may be arranged to route electrical signals in a direction of a plane that is substantially parallel with a surface of the die substrate 702 upon which the device layer 704 is formed. For example, the lines 728a may route electrical signals in a direction in and out of the page and/or in a direction across the page. The vias 728b may be arranged to route electrical signals in a direction of a plane that is substantially perpendicular to the surface of the die substrate 702 upon which the device layer 704 is formed. In some embodiments, the vias 728b may electrically couple lines 728a of different interconnect layers 706-710 together.

The interconnect layers 706-710 may include a dielectric material 726 disposed between the interconnect structures 728, as shown in FIG. 7. In some embodiments, dielectric material 726 disposed between the interconnect structures 728 in different ones of the interconnect layers 706-710 may have different compositions; in other embodiments, the composition of the dielectric material 726 between different interconnect layers 706-710 may be the same. The device layer 704 may include a dielectric material 726 disposed between the transistors 740 and a bottom layer of the metallization stack as well. The dielectric material 726 included in the device layer 704 may have a different composition than the dielectric material 726 included in the interconnect layers 706-710; in other embodiments, the composition of the dielectric material 726 in the device layer 704 may be the same as a dielectric material 726 included in any one of the interconnect layers 706-710.

A first interconnect layer 706 (referred to as Metal 1 or "M1") may be formed directly on the device layer 704. In some embodiments, the first interconnect layer 706 may include lines 728a and/or vias 728b, as shown. The lines 728a of the first interconnect layer 706 may be coupled with contacts (e.g., the S/D contacts 724) of the device layer 704. The vias 728b of the first interconnect layer 706 may be coupled with the lines 728a of a second interconnect layer 708.

The second interconnect layer 708 (referred to as Metal 2 or "M2") may be formed directly on the first interconnect layer 706. In some embodiments, the second interconnect layer 708 may include via 728b to couple the lines 728 of the second interconnect layer 708 with the lines 728a of a third interconnect layer 710. Although the lines 728a and the vias 728b are structurally delineated with a line within individual interconnect layers for the sake of clarity, the lines 728a and the vias 728b may be structurally and/or materially contiguous (e.g., simultaneously filled during a dual-damascene process) in some embodiments.

The third interconnect layer 710 (referred to as Metal 3 or "M3") (and additional interconnect layers, as desired) may be formed in succession on the second interconnect layer 708 according to similar techniques and configurations described in connection with the second interconnect layer 708 or the first interconnect layer 706. In some embodiments, the interconnect layers that are "higher up" in the metallization stack 719 in the integrated circuit 700 (i.e., farther away from the device layer 704) may be thicker that the interconnect layers that are lower in the metallization stack 719, with lines 728a and vias 728b in the higher interconnect layers being thicker than those in the lower interconnect layers.

The integrated circuit 700 may include a solder resist material 734 (e.g., polyimide or similar material) and one or more conductive contacts 736 formed on the interconnect layers 706-710. In FIG. 7, the conductive contacts 736 are illustrated as taking the form of bond pads. The conductive contacts 736 may be electrically coupled with the interconnect structures 728 and configured to route the electrical signals of the transistor(s) 740 to external devices. For example, solder bonds may be formed on the one or more conductive contacts 736 to mechanically and/or electrically couple an integrated circuit die including the integrated circuit 700 with another component (e.g., a printed circuit board). The integrated circuit 700 may include additional or alternate structures to route the electrical signals from the interconnect layers 706-710; for example, the conductive contacts 736 may include other analogous features (e.g., posts) that route the electrical signals to external components.

In some embodiments in which the integrated circuit 700 is a double-sided die, the integrated circuit 700 may include another metallization stack (not shown) on the opposite side of the device layer(s) 704. This metallization stack may include multiple interconnect layers as discussed above with reference to the interconnect layers 706-710, to provide conductive pathways (e.g., including conductive lines and vias) between the device layer(s) 704 and additional conductive contacts (not shown) on the opposite side of the integrated circuit 700 from the conductive contacts 736.

In other embodiments in which the integrated circuit 700 is a double-sided die, the integrated circuit 700 may include one or more through silicon vias (TSVs) through the die substrate 702; these TSVs may make contact with the device layer(s) 704, and may provide conductive pathways between the device layer(s) 704 and additional conductive contacts (not shown) on the opposite side of the integrated circuit 700 from the conductive contacts 736. In some embodiments, TSVs extending through the substrate can be used for routing power and ground signals from conductive contacts on the opposite side of the integrated circuit 700 from the conductive contacts 736 to the transistors 740 and any other components integrated into the die 700, and the metallization stack 719 can be used to route I/O signals from the conductive contacts 736 to transistors 740 and any other components integrated into the die 700.

Multiple integrated circuits 700 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 8:
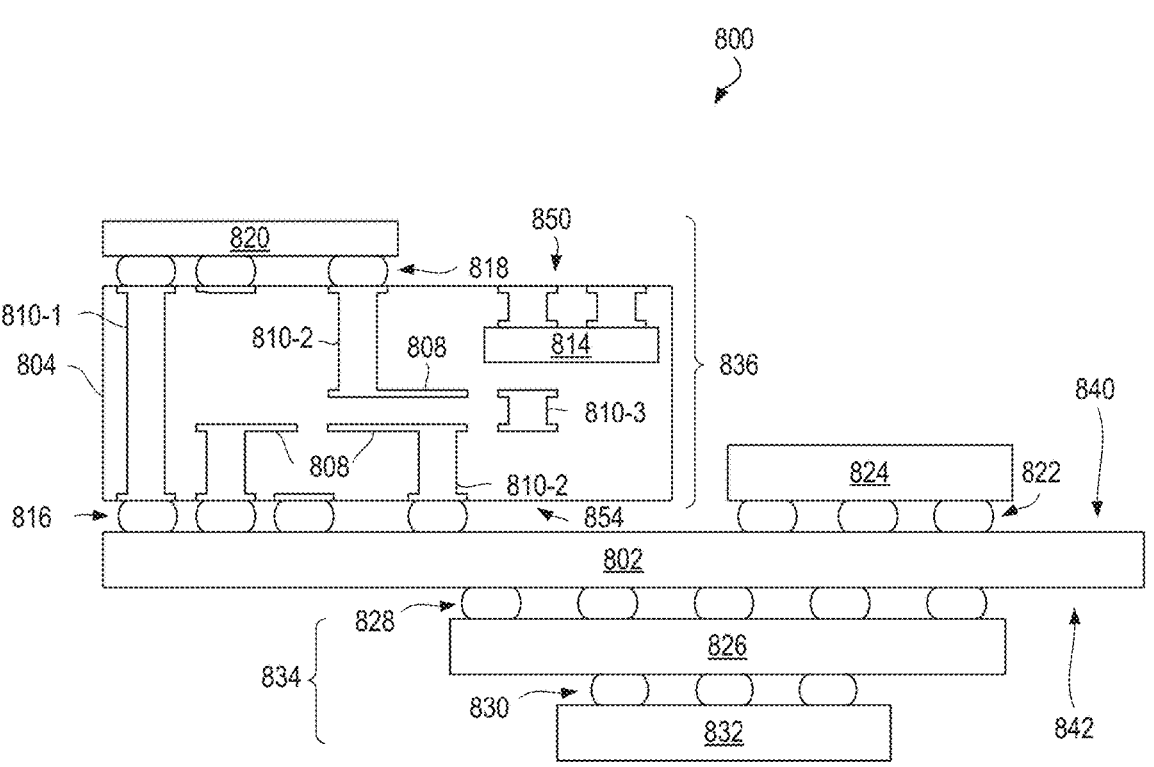
FIG. 8 is a cross-sectional side view of a microelectronic assembly that may include any of the embodiments disclosed herein.

FIG. 8 is a cross-sectional side view of a microelectronic assembly 800 that may include any of the embodiments disclosed herein. The microelectronic assembly 800 includes multiple integrated circuit components disposed on a circuit board 802 (which may be a motherboard, system board, mainboard, etc.). The microelectronic assembly 800 may include components disposed on a first face 840 of the circuit board 802 and an opposing second face 842 of the circuit board 802; generally, components may be disposed on one or both faces 840 and 842.

In some embodiments, the circuit board 802 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 802. In other embodiments, the circuit board 802 may be a non-PCB substrate. The microelectronic assembly 800 illustrated in FIG. 8 includes a package-on-interposer structure 836 coupled to the first face 840 of the circuit board 802 by coupling components 816. The coupling components 816 may electrically and mechanically couple the package-oninterposer structure 836 to the circuit board 802, and may include solder balls (as shown in FIG. 8), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 836 may include an integrated circuit component 820 coupled to an interposer 804 by coupling components 818. The coupling components 818 may take any suitable form for the application, such as the forms discussed above with reference to the coupling components 816. Although a single integrated circuit component 820 is shown in FIG. 8, multiple integrated circuit components may be coupled to the interposer 804; indeed, additional interposers may be coupled to the interposer 804. The interposer 804 may provide an intervening substrate used to bridge the circuit board 802 and the integrated circuit component 820.

The integrated circuit component 820 may be a packaged or unpackaged integrated circuit component that includes one or more integrated circuit dies (e.g., the die 602 of FIG. 6, the integrated circuit 700 of FIG. 7) and/or one or more other suitable components.

The unpackaged integrated circuit component 820 comprises solder bumps attached to contacts on the die. The solder bumps allow the die to be directly attached to the interposer 804. In embodiments where the integrated circuit component 820 comprises multiple integrated circuit dies, the dies can be of the same type (a homogeneous multi-die integrated circuit component) or of two or more different types (a heterogeneous multi-die integrated circuit component). In addition to comprising one or more processor units, the integrated circuit component 820 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof. A packaged multi-die integrated circuit component can be referred to as a multi-chip package (MCP) or multi-chip module (MCM).

Generally, the interposer 804 may spread connections to a wider pitch or reroute a connection to a different connection. For example, the interposer 804 may couple the integrated circuit component 820 to a set of ball grid array (BGA) conductive contacts of the coupling components 816 for coupling to the circuit board 802. In the embodiment illustrated in FIG. 8, the integrated circuit component 820 and the circuit board 802 are attached to opposing sides of the interposer 804; in other embodiments, the integrated circuit component 820 and the circuit board 802 may be attached to a same side of the interposer 804. In some embodiments, three or more components may be interconnected by way of the interposer 804.

In some embodiments, the interposer 804 may be formed as a PCB, including multiple metal layers separated from one another by layers of dielectric material and interconnected by electrically conductive vias. In some embodiments, the interposer 804 may be formed of an epoxy resin, a fiberglass-reinforced epoxy resin, an epoxy resin with inorganic fillers, a ceramic material, or a polymer material such as polyimide. In some embodiments, the interposer 804 may be formed of alternate rigid or flexible materials that may include the same materials described above for use in a semiconductor substrate, such as silicon, germanium, and other group III-V and group IV materials. The interposer 804 may include metal interconnects 808 and vias 810, including but not limited to through hole vias 810-1 (that extend from a first face 850 of the interposer 804 to a second face 854 of the interposer 804), blind vias 810-2 (that extend from the first or second faces 850 or 854 of the interposer 804 to an internal metal layer), and buried vias 810-3 (that connect internal metal layers).

In some embodiments, the interposer 804 can comprise a silicon interposer. Through silicon vias (TSV) extending through the silicon interposer can connect connections on a first face of a silicon interposer to an opposing second face of the silicon interposer. In some embodiments, an interposer 804 comprising a silicon interposer can further comprise one or more routing layers to route connections on a first face of the interposer 804 to an opposing second face of the interposer 804.

The interposer 804 may further include embedded devices 814, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 804. The package-on-interposer structure 836 may take the form of any of the package-on-interposer structures known in the art. In embodiments where the interposer is a non-printed circuit board The integrated circuit assembly 800 may include an integrated circuit component 824 coupled to the first face 840 of the circuit board 802 by coupling components 822. The coupling components 822 may take the form of any of the embodiments discussed above with reference to the coupling components 816, and the integrated circuit component 824 may take the form of any of the embodiments discussed above with reference to the integrated circuit component 820.

The integrated circuit assembly 800 illustrated in FIG. 8 includes a package-on-package structure 834 coupled to the second face 842 of the circuit board 802 by coupling components 828. The package-on-package structure 834 may include an integrated circuit component 826 and an integrated circuit component 832 coupled together by coupling components 830 such that the integrated circuit component 826 is disposed between the circuit board 802 and the integrated circuit component 832. The coupling components 828 and 830 may take the form of any of the embodiments of the coupling components 816 discussed above, and the integrated circuit components 826 and 832 may take the form of any of the embodiments of the integrated circuit component 820 discussed above. The package-on-package structure 834 may be configured in accordance with any of the package-on-package structures known in the art.

Figure 9:
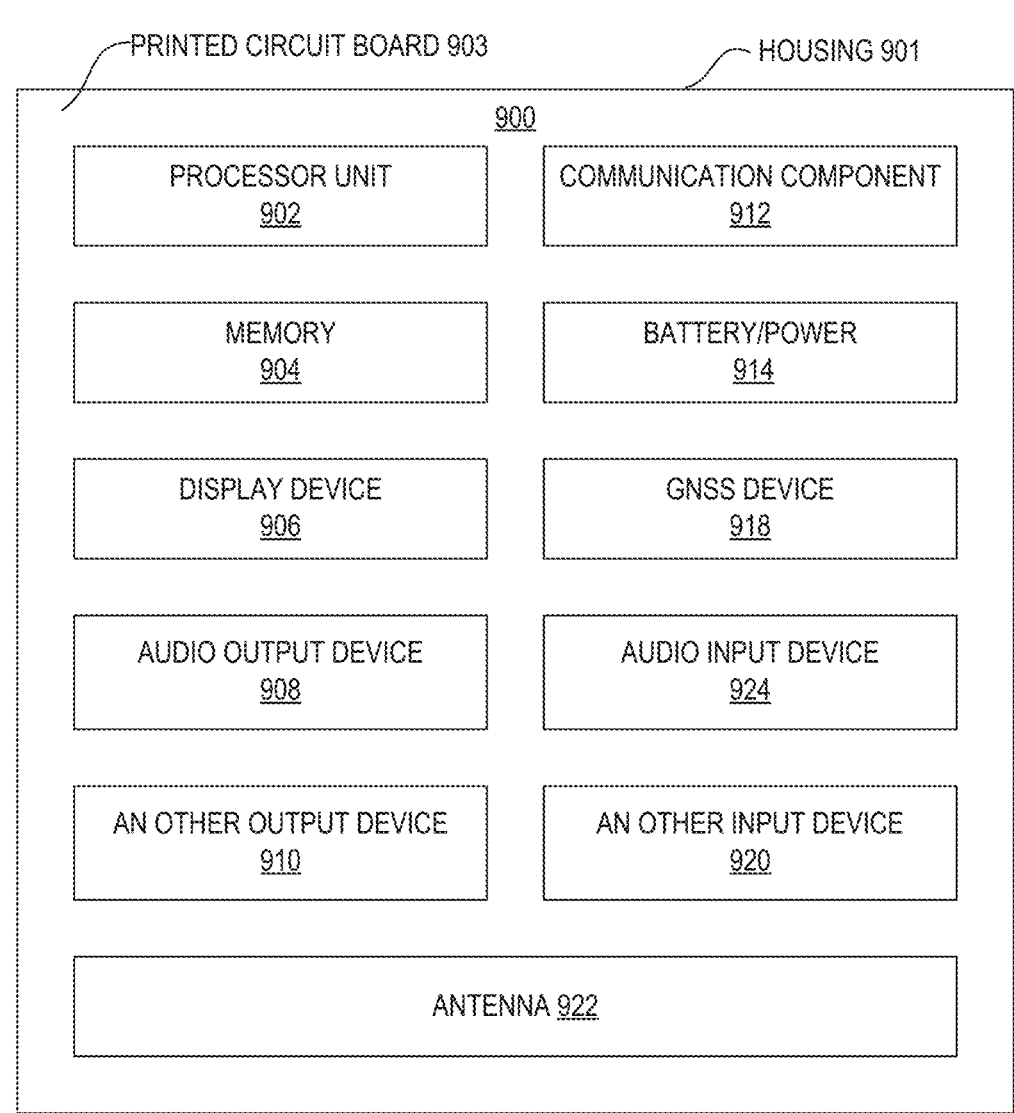
FIG. 9 is a block diagram of an example electrical device that may include any of the embodiments disclosed herein.

FIG. 9 is a block diagram of an example electrical device 900 that may include one or more of the embodiments disclosed herein. For example, any suitable ones of the components of the electrical device 900 may include one or more of the microelectronic assemblies 800, integrated circuit components 820, integrated circuits 700, integrated circuit dies 602, or structures disclosed herein. A number of components are illustrated in FIG. 9 as included in the electrical device 900, but any one or more of these components may be omitted or duplicated, as suitable for the application. In some embodiments, some or all of the components included in the electrical device 900 may be attached to one or more motherboards, mainboards, printed circuit boards 903, or system boards. In some embodiments, one or more of these components are fabricated onto a single system-on-a-chip (SoC) die. In various embodiments, the electrical device 900 is enclosed by, or integrated with, a housing 901.

Additionally, in various embodiments, the electrical device 900 may not include one or more of the components illustrated in FIG. 9, but the electrical device 900 may include interface circuitry for coupling to the one or more components. For example, the electrical device 900 may not include a display device 906, but may include display device interface circuitry (e.g., a connector and driver circuitry) to which a display device 906 may be coupled. In another set of examples, the electrical device 900 may not include an audio input device 924 or an audio output device 908, but may include audio input or output device interface circuitry (e.g., connectors and supporting circuitry) to which an audio input device 924 or audio output device 908 may be coupled.

The electrical device 900 may include one or more processor units 902 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 902 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller crypto processors (specialized processors that execute cryptographic algorithms within hardware), server processors, controllers, or any other suitable type of processor units. As such, the processor unit can be referred to as an XPU (or xPU).

The electrical device 900 may include a memory 904, which may itself include one or more memory devices such as volatile memory (e.g., dynamic random access memory (DRAM), static random-access memory (SRAM)), nonvolatile memory (e.g., read-only memory (ROM), flash memory, chalcogenide-based phase-change non-voltage memories), solid state memory, and/or a hard drive. In some embodiments, the memory 904 may include memory that is located on the same integrated circuit die as the processor unit 902. This memory may be used as cache memory (e.g., Level 1 (L1), Level 2 (L2), Level 3 (L3), Level 4 (L4), Last Level Cache (LLC)) and may include embedded dynamic random-access memory (eDRAM) or spin transfer torque magnetic random-access memory (STT-MRAM).

In some embodiments, the electrical device 900 can comprise one or more processor units 902 that are heterogeneous or asymmetric to another processor unit 902 in the electrical device 900. There can be a variety of differences between the processing units 902 in a system in terms of a spectrum of metrics of merit including architectural, microarchitectural, thermal, power consumption characteristics, and the like. These differences can effectively manifest themselves as asymmetry and heterogeneity among the processor units 902 in the electrical device 900.

In some embodiments, the electrical device 900 may include a communication component 912 (e.g., one or more communication components). For example, the communication component 912 can manage wireless communications for the transfer of data to and from the electrical device 900. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 912 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 912 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 912 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 912 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 912 may operate in accordance with other wireless protocols in other embodiments. The electrical device 900 may include an antenna 922 to facilitate wireless communications and/or to receive other wireless communications (such as AM or FM radio transmissions).

In some embodiments, the communication component 912 may manage wired communications, such as electrical, optical, or any other suitable communication protocols (e.g., IEEE 802.3 Ethernet standards). As noted above, the communication component 912 may include multiple communication components. For instance, a first communication component 912 may be dedicated to shorter-range wireless communications such as Wi-Fi or Bluetooth, and a second communication component 912 may be dedicated to longer-range wireless communications such as global positioning system (GPS), EDGE, GPRS, CDMA, WiMAX, LTE, EV-DO, or others. In some embodiments, a first communication component 912 may be dedicated to wireless communications, and a second communication component 912 may be dedicated to wired communications.

The electrical device 900 may include battery/power circuitry 914. The battery/power circuitry 914 may include one or more energy storage devices (e.g., batteries or capacitors) and/or circuitry for coupling components of the electrical device 900 to an energy source separate from the electrical device 900 (e.g., AC line power).

The electrical device 900 may include a display device 906 (or corresponding interface circuitry, as discussed above). The display device 906 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 900 may include an audio output device 908 (or corresponding interface circuitry, as discussed above). The audio output device 908 may include any embedded or wired or wirelessly connected external device that generates an audible indicator, such speakers, headsets, or earbuds.

The electrical device 900 may include an audio input device 924 (or corresponding interface circuitry, as discussed above). The audio input device 924 may include any embedded or wired or wirelessly connected device that generates a signal representative of a sound, such as microphones, microphone arrays, or digital instruments (e.g., instruments having a musical instrument digital interface (MIDI) output). The electrical device 900 may include a Global Navigation Satellite System (GNSS) device 918 (or corresponding interface circuitry, as discussed above), such as a Global Positioning System (GPS) device. The GNSS device 918 may be in communication with a satellite-based system and may determine a geolocation of the electrical device 900 based on information received from one or more GNSS satellites, as known in the art.

The electrical device 900 may include another output device 910 (or corresponding interface circuitry, as discussed above). Examples of the other output device 910 may include an audio codec, a video codec, a printer, a wired or wireless transmitter for providing information to other devices, or an additional storage device.

The electrical device 900 may include another input device 920 (or corresponding interface circuitry, as discussed above). Examples of the other input device 920 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 900 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra-mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 900 may be any other electronic device that processes data. In some embodiments, the electrical device 900 may comprise multiple discrete physical components. Given the range of devices that the electrical device 900 can be manifested as in various embodiments, in some embodiments, the electrical device 900 can be referred to as a computing device or a computing system.

Thus, embodiments of a structure for an open-cavity photonic integrated circuit (OCPIC) having a micro-ring resonator (MRR) have been provided. The provided embodiments advantageously enhance power efficiency of the MRR and the OCPIC. Embodiments enable the use of finer pitch architectures and high-density input/output (I/O) designs without impacting thermal efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As used herein, phrases such as "an embodiment," "various embodiments," "some embodiments," and the like, indicate that some embodiments may have some, all, or none of the features described for other embodiments. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" or the term "one or more of" can mean any combination of the listed terms. For example, the phrase "at least one of A, B or C" can mean A; B; C; A and B; A and C; B and C; or A, B, and C. Likewise, the phrase "one or more of A, B and C" can mean A; B; C; A and B; A and C; B and C; or A, B, and C.

As used in this application and the claims, the phrase "individual of" or "respective of" following by a list of items recited or stated as having a trait, feature, etc. means that all of the items in the list possess the stated or recited trait, feature, etc. For example, the phrase "individual of A, B, or C, comprise a sidewall" or "respective of A, B, or C, comprise a sidewall" means that A comprises a sidewall, B comprises sidewall, and C comprises a sidewall.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

EXAMPLES

Example 1 is a structure, comprising: a silicon waveguide structure located on a substrate; an oxide layer overlaid on the silicon waveguide structure and substrate; an air trench located in the oxide layer, the air trench encircling at least a portion of the silicon waveguide structure, the air trench characterized by a substantially straight wall; and an air cavity located under the silicon waveguide structure, in the substrate, the air cavity in fluid communication with the air trench.

Example 2 includes the subject matter of Example 1, wherein the substantially straight wall is perpendicular to a floor of the air trench.

Example 3 includes the subject matter of any of the preceding Examples, wherein the air trench is further characterized by a planar area that is perpendicular to the substantially straight wall, the planar area is represented by rotating a width radially around the silicon waveguide structure.

Example 4 includes the subject matter of any of the preceding Examples, wherein the air trench is further characterized by a consistent width.

Example 5 includes the subject matter of any of the preceding Examples, wherein the air trench is further characterized by a depth.

Example 6 includes the subject matter of any of Examples 1-4, wherein the air trench is further characterized by a planar area with a diameter D1 separated by a depth from a planar floor in the substrate, the planar floor having a diameter D2, and wherein D1 and D2 are substantially equal and substantially coaxial.

Example 7 includes the subject matter of any of the preceding Examples, wherein the air trench and the air cavity are further characterized by a planar floor.

Example 8 includes the subject matter of any of the preceding Examples, further comprising a buried oxide layer (BOX) located between the oxide layer and the substrate, and wherein: the silicon waveguide structure is located on the BOX: and the air trench extends through the BOX.

Example 9 includes the subject matter of any of the preceding Examples, further comprising a thinned area in the oxide layer located above the silicon waveguide structure.

Example 10 is a multi-chip package (MCP), comprising: a substrate; an open-cavity photonic integrated circuit (OCPIC) attached to the substrate, the OCPIC having a micro-ring resonator (MRR) located between a silicon layer and an oxide layer; an air trench located in the oxide layer, the air trench encircling at least a portion of the MRR, the air trench characterized by a substantially straight wall; and an air cavity located under the MRR, in the silicon layer, the air cavity in fluid communication with the air trench.

Example 11 includes the subject matter of Example 10, further comprising a processing unit attached to the substrate.

Example 12 includes the subject matter of Example 11, further comprising a silicon bridge in the substrate, and wherein the processing unit and the OCPIC are operationally coupled via the silicon bridge.

Example 13 includes the subject matter of any of Examples 10-12, wherein the substantially straight wall is perpendicular to a floor of the air cavity.

Example 14 includes the subject matter of any of Examples 10-13, wherein the air trench is further characterized by a planar area that is perpendicular to the substantially straight wall, the planar area is represented by rotating a width radially around the MRR.

Example 15 includes the subject matter of any of Examples 10-14, wherein the air trench is further characterized by a consistent width and a consistent depth.

Example 16 includes the subject matter of any of Examples 10-14, wherein the air trench is further characterized by a planar area with a diameter D1 separated from a planar floor with a diameter D1, by a depth, and wherein D1 and D2 are substantially equal and substantially coaxial.

Example 17 includes the subject matter of any of Examples 10-15, wherein the air trench and the air cavity are further characterized by a planar floor.

Example 18 includes the subject matter of any of Examples 10-16, further comprising a buried oxide layer (BOX) located between the oxide layer and the silicon layer, and wherein: the MRR is located on the BOX: and the air trench extends through the BOX.

Example 19 includes the subject matter of any of Examples 10-17, further comprising a thinned area in the oxide layer located above the MRR.

Example 20 is a device, comprising: multi-chip package (MCP), comprising: a substrate; an open-cavity photonic integrated circuit (OCPIC) attached to the substrate, the OCPIC having a micro-ring resonator (MRR) located between a silicon layer and an oxide layer; an air trench located in the oxide layer, the air trench encircling at least a portion of the MRR, the air trench characterized by a substantially straight wall; and an air cavity located under the MRR, in the silicon layer, the air cavity in fluid communication with the air trench.

Example 21 includes the subject matter of Example 20, further comprising a printed circuit board, and wherein the MCP is attached to the printed circuit board.

Example 22 includes the subject matter of any of Examples 20 or 21, wherein the air trench is further characterized by a planar area with a diameter D1 separated from a planar floor with a diameter D1 by a depth, and wherein D1 and D2 are substantially equal and substantially coaxial.

Example 23 includes the subject matter of any of Examples 20-22, further comprising a buried oxide layer (BOX) located between the oxide layer and the silicon layer, and wherein: the MRR is located on the BOX: and the air trench extends through the BOX.

Example 24 is a method for manufacturing a structure for an OCPIC having an MRR, comprising: on a first piece of silicon, thinning a layer in a region to create an air cavity; on a second piece of silicon, having a MRR manufactured thereon, removing a layer of silicon under the MRR; attaching the air cavity in the first piece of silicon to the second piece of silicon to position the MRR over the air cavity; and etching an air trench in an oxide layer, such that the air trench is in fluid communication with the air cavity.

Example 25 includes the subject matter of Example 24, further comprising adding conductive contacts to a top surface of the OCPIC.

What is claimed is:
1. A structure, comprising:
a silicon waveguide structure located on a substrate;
an oxide layer overlaid on the silicon waveguide structure and substrate;

an air trench located in the oxide layer, the air trench encircling at least a portion of the silicon waveguide structure, the air trench characterized by a substantially straight wall; and an air cavity located under the silicon waveguide structure, in the substrate, the air cavity in fluid communication with the air trench.

2. The structure of claim 1, wherein the substantially straight wall is perpendicular to a floor of the air trench.

3. The structure of claim 1, wherein the air trench is further characterized by a planar area that is perpendicular to the substantially straight wall, the planar area is represented by rotating a width radially around the silicon waveguide structure.

4. The structure of claim 1, wherein the air trench is further characterized by a consistent width.

5. The structure of claim 1, wherein the air trench is further characterized by a depth.

6. The structure of claim 1, wherein the air trench is further characterized by a planar area with a diameter D1 separated by a depth from a planar floor in the substrate, the planar floor having a diameter D2, and wherein D1 and D2 are substantially equal and substantially coaxial.

7. The structure of claim 1, wherein the air trench and the air cavity are further characterized by a planar floor.

8. The structure of claim 1, further comprising a buried oxide layer (BOX) located between the oxide layer and the substrate, and wherein:

the silicon waveguide structure is located on the BOX; and the air trench extends through the BOX.

9. The structure of claim 1, further comprising a thinned area in the oxide layer located above the silicon waveguide structure.

10. A multi-chip package (MCP), comprising:

a substrate;

an open-cavity photonic integrated circuit (OCPIC) attached to the substrate, the OCPIC having a micro-ring resonator (MRR) located between a silicon layer and an oxide layer;

an air trench located in the oxide layer, the air trench encircling at least a portion of the MRR, the air trench characterized by a substantially straight wall; and an air cavity located under the MRR, in the silicon layer, the air cavity in fluid communication with the air trench.

11. The MCP of claim 10, further comprising a processing unit attached to the substrate.

12. The MCP of claim 11, further comprising a silicon bridge in the substrate, and wherein the processing unit and the OCPIC are operationally coupled via the silicon bridge.

13. The MCP of claim 10, wherein the substantially straight wall is perpendicular to a floor of the air cavity.

14. The MCP of claim 10, wherein the air trench is further characterized by a planar area that is perpendicular to the substantially straight wall, the planar area is represented by rotating a width radially around the MRR.

15. The MCP of claim 10, wherein the air trench is further characterized by a consistent width and a consistent depth.

16. The MCP of claim 10, wherein the air trench is further characterized by a planar area with a diameter D1 separated from a planar floor with a diameter D1, by a depth, and wherein D1 and D2 are substantially equal and substantially coaxial.

17. The MCP of claim 10, wherein the air trench and the air cavity are further characterized by a planar floor.

18. The MCP of claim 10, further comprising a buried oxide layer (BOX) located between the oxide layer and the silicon layer, and wherein:

the MRR is located on the BOX; and the air trench extends through the BOX.

19. The MCP of claim 10, further comprising a thinned area in the oxide layer located above the MRR.

20. A device, comprising:

a printed circuit board; and multi-chip package (MCP) attached to the printed circuit board, the MCP comprising:

a substrate;

an open-cavity photonic integrated circuit (OCPIC) attached to the substrate, the OCPIC having a micro-ring resonator (MRR) located between a silicon layer and an oxide layer;

an air trench located in the oxide layer, the air trench encircling at least a portion of the MRR, the air trench characterized by a substantially straight wall; and an air cavity located under the MRR, in the silicon layer, the air cavity in fluid communication with the air trench.

21. The device of claim 20, further comprising a housing.

22. The device of claim 20, wherein the air trench is further characterized by a planar area with a diameter D1 separated from a planar floor with a diameter D1 by a depth, and wherein D1 and D2 are substantially equal and substantially coaxial.

23. The device of claim 20, further comprising a buried oxide layer (BOX) located between the oxide layer and the silicon layer, and wherein:

the MRR is located on the BOX; and the air trench extends through the BOX.

24. A method for manufacturing a structure for an OCPIC having an MRR, comprising:

on a first piece of silicon, thinning a layer in a region to create an air cavity;

on a second piece of silicon, having a MRR manufactured thereon, removing a layer of silicon under the MRR;

attaching the air cavity in the first piece of silicon to the second piece of silicon to position the MRR over the air cavity; and etching an air trench in an oxide layer, such that the air trench is in fluid communication with the air cavity.

25. The method of claim 24, further comprising adding conductive contacts to a top surface of the OCPIC.

* * * * *